Figure 1:
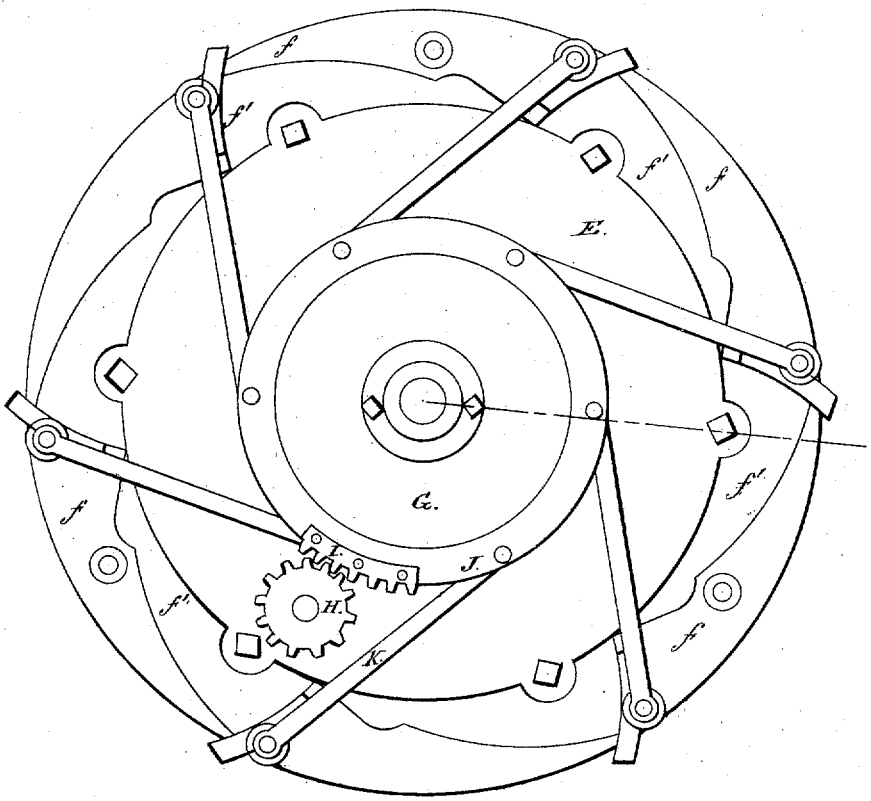

3 Sheets--Sheet 1.

J. TEMPLE.

Water-Wheels.

No. 5,908.

Reissued June 9, 1874.

*Attest.*
John M. Davidson
W. R. K. Rick

*Inventor.*
John Temple

AM. PHOTO-LITHOGRAPHIC CO. N. Y. (OSBORNE'S PROCESS)

3 Sheets--Sheet 2.
J. TEMPLE.
Water-Wheels.
No. 5,908. Reissued June 9, 1874.
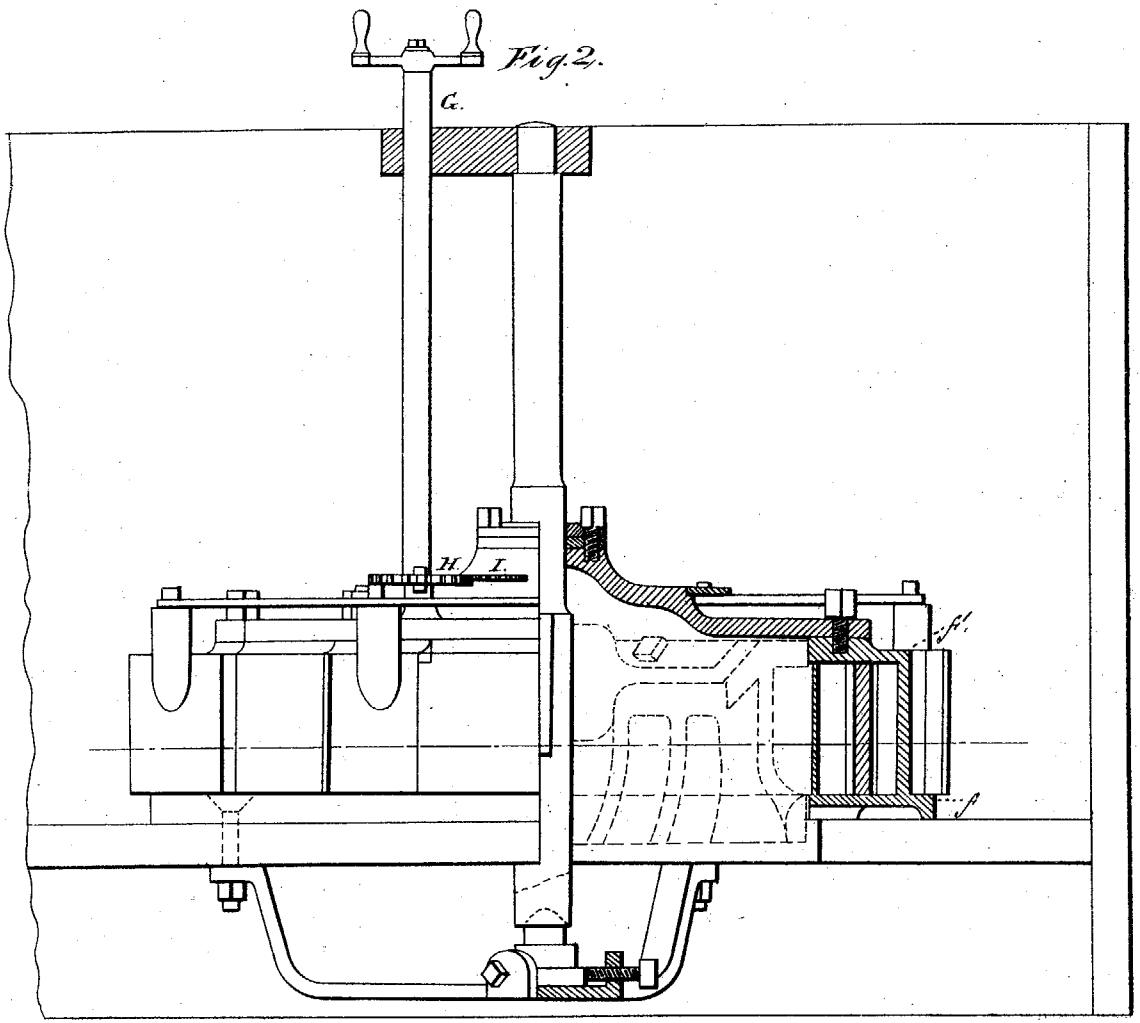
Attest,
John W. Dairdson
H. C. K. Peck
Inventor,
John Temple
AM. PHOTO-LITHOGRAPHIC Co. N. Y. (OSBORNE'S PROCESS.)

3 Sheets--Sheet 3.

J. TEMPLE.

Water-Wheels.

No. 5,908. Reissued June 9, 1874.

Attest:
John M. Davidson
H. R. K. Rick

Inventor:
John Temple

AM. PHOTO-LITHOGRAPHIC Co. N.Y. (OSBORNE'S PROCESS.)

UNITED STATES PATENT OFFICE.

JOHN TEMPLE, OF DAYTON, OHIO.

IMPROVEMENT IN WATER-WHEELS.

Specification forming part of Letters Patent No. 22,902, dated February 8, 1859; reissue No. 1,405, dated February 10, 1863; extended seven years; reissue No. 5,908, dated June 9, 1874; application filed January 5, 1874.

*To all whom it may concern:*

Be it known that I, JOHN TEMPLE, of Dayton, Ohio, have invented a new and useful Improvement in Water-Wheels, invented by me and patented in 1859, and extended in 1873; and I do hereby declare that the following is a full and exact description of the construction and operation of the same, reference being had to the accompanying drawings making a part of this specification.

The objects of this invention are to secure freedom of action to the gates of submerged water-wheels, so that they can be quickly governed and easily controlled uniformly through a centrally-connected mechanism that will vibrate them simultaneously; also, to insure integrity and solidity, and give unvarying direction to the varying volume of water admitted to the wheel through chuteways of changeable capacity.

The combinations embraced in this invention involve the use of guards cast between the rims of the wheel-case for the prevention of undue hydrostatic pressure upon, and resistance to, the vibrations of the gates; to a fixed guide, also cast between the rims of the case, to uniformly direct the changeable volume of water from a variable chuteway at the same tangent upon the wheel; to a lateral wing for the gate to prevent eddies and backlash, and to relieve the gate-hinge from unequal strain; and to a combination of centrally-connected mechanism, seated upon the crown-plate of the wheel-case, with a series of guarded gates, free to be governed and vibrated simultaneously, as the irregular nature of the work of a mill may require, as herein more fully described.

Various mechanisms located above a sluice-chest for simultaneously opening and closing a series of gates have long been known and used, and levers and rings are among the devices which have been employed for this purpose. I do not, therefore, desire to be understood as claiming these devices; but, unless the gates are so guarded as to stand substantially *in equilibrio*, whether entirely opened or partly closed, such mechanisms for operating them, and through which their vibrations are to be governed, will not act uniformly and with equal ease and facility under all the varying conditions of the gates. The centrally-connected mechanism is especially adapted to act in combination with my guarded gates, and without an equivalent gate-operating mechanism the series of equidistant gates surrounding the wheel would not be efficient for the purposes designed.

The sluice-chest or case, which surrounds the water-wheel, consists of two rims, *f f'*, with guards and guides cast upon the rims, and a crown-plate. The guards A are for the protection of the gates B, which are provided with lateral wings C. The gates B constitute movable sides of the chuteways, and are hinged in a socket, *a*, so that their inner face always coincides with the face of its respective guide D, upon which the gate is seated. Gudgeons project from the upper edges of the gate-wings, by which they are linked with the centrally-connected mechanism for governing the movements of the gates. In the drawings this mechanism (represented at H I J) serves to actuate the gates and to expand and contract the chuteways. The guards A and the two rims *f f'*, with the wings C, protect the gates and keep them *in equilibrio*, and, consequently, they will vibrate easily and quickly, as they may be influenced by, or adjusted to, the changeable nature of the work of a mill or manufactory in which this water-wheel is used. A crown-plate, E, closes the top of the case, and serves as a seat for the centrally-connected gate-operating mechanism. The guide D and rims direct the inflowing water which passes the chuteway, whether of greater or less volume, upon the buckets near the periphery of the wheel, in the same tangential line, so that the ratio of power is fully maintained when the volume is diminished by partially closing the gates and chutes. The outer edge of the upper rim, *f'*, of the wheel-case is not concentric with the outer edge of the lower rim, *f*, as it conforms to the shape of the guards A, and a portion of it, against which the wing C works, is concentric with the knuckle of the gate-hinge. This construction is necessary to allow the wings to extend above the gates and form water-tight joints, which prevent leakage when the gates are closed, and to compensate for the wear of friction. The peculiarity of these features of the construction secures some of the most important objects of this invention.

My improved water-wheel is especially adapted for use in mills employing delicate machinery, such as manufactured fibrous and textile goods, which require that the power should be easily controlled, and be increased and diminished momentarily, according to the variable nature of the work, and thereby prevent sudden strains and irregularities injurious to machinery and to the quality of the fabrics made.

Figure 4:
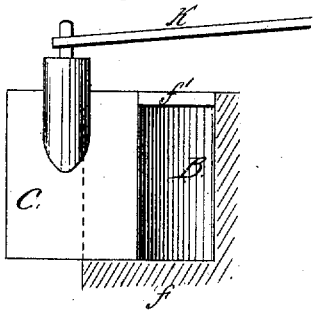
Figure 3:
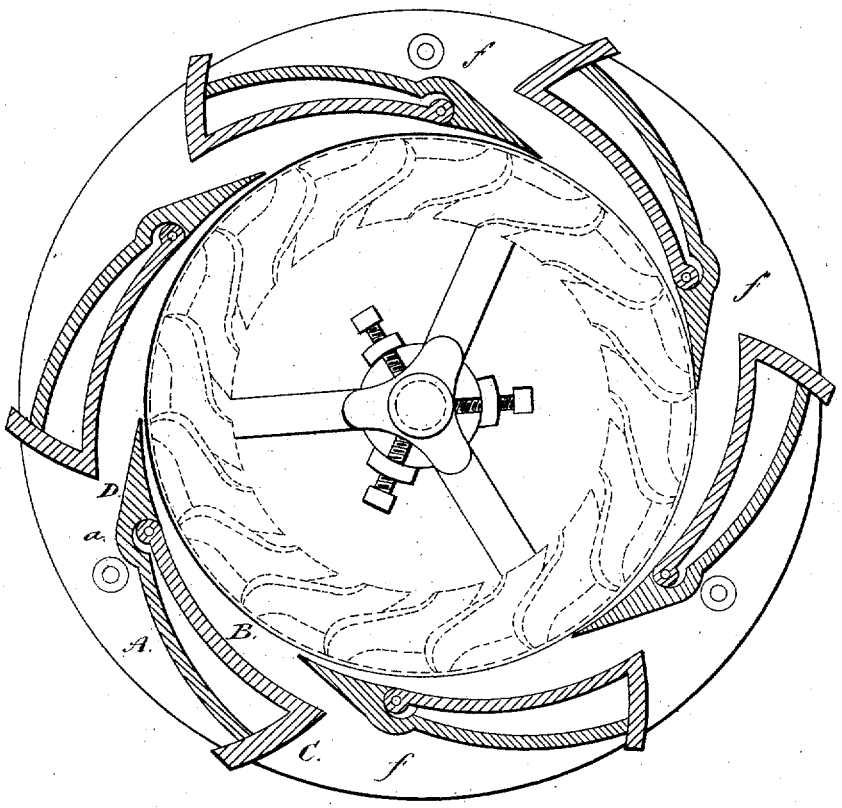

Figure 1 of the drawings is a top view of the wheel-case and the centrally-connected mechanism through which the gates are operated. Fig. 2 is a sectional side elevation, with the wheel-shaft and gearing by which the gates are actuated. Fig. 3 is a horizontal section of the wheel-case, wheel, gates, and wings. Fig. 4 represents the lateral wing of the gate in elevation, and its relative arrangement with the rims *f f'*.

This invention is represented at A, B, C, and D in Fig. 3, and involves specified combinations with the wheel-case and gate-operating mechanism.

In operation, the case, with its gates and the mechanism connected therewith, is submerged in a flume or fore-bay beneath any head of water, and a scroll-bucket turbine wheel is centered and stepped within the case, as shown in Fig. 2. The water is admitted to pass through the chuteways between the rims of the case, and between the hinged gate B and the outer surface of the guide D, being always directed parallel with the longitudinal line of the gate, and toward the seat of the gate-hinge, whence it is directed by the fixed guide D and the rims tangentially to the periphery of the wheel; and the series of surrounding chuteways are so arranged in relation to each other and to the wheel that the entire series of buckets of the wheel is constantly subjected to the action of the water equally, whether a greater or less quantity is admitted through the chuteways. The gate-operating mechanism should be centrally connected to be capable of use with any number of surrounding gates, and because of the greater facility and certainty of its action; and the crown-plate E, which serves as a seat for this mechanism, is cast with a central disk, G, which serves as an arbor, around which the gate-operating mechanism moves and is guided.

It will be understood that there is sufficient space between the rims and gates to permit the water to pass back and forth as the gates vibrate upon their hinges.

I claim as my invention, as an improvement in incased submerged turbine water-wheels—

1. The combination of a series of gates, B, with guards A and the wheel-case rims, substantially as described.

2. The combination of the fixed guides and variable chuteways with the gate-guards and wheel-case rims, substantially as described.

3. The guarded vibratory gates, case-rims, and variable chuteways, in combination with centrally seated and connected mechanism, substantially as described, for the purpose specified.

4. The wheel-case rims, guards, and guides, in combination with the projecting gate-wings, substantially as described.

5. The crown-plate E, with its raised disk-arbor G, in combination with the centrally-connected gate-operating mechanism, substantially as described.

JOHN TEMPLE.

Witnesses:
JOHN M. DAVIDSON,
H. P. K. PECK.